US005607982A

United States Patent [19]

Heyman et al.

[11] Patent Number: 5,607,982
[45] Date of Patent: Mar. 4, 1997

[54] FLEXIBLE OPEN-CELL POLYURETHANE FOAM

[75] Inventors: Duane A. Heyman, Monroe; Theodore M. Smiecinski, Woodhaven; Donald C. Mente, Grosse Ile, all of Mich.

[73] Assignee: BASF Corporation, Mt. Olive, N.J.

[21] Appl. No.: 594,545

[22] Filed: Jan. 31, 1996

Related U.S. Application Data

[63] Continuation of Ser. No. 272,475, Jul. 11, 1994, abandoned.

[51] Int. Cl.$^6$ ............................................. C08J 9/28
[52] U.S. Cl. ................... 521/67; 521/65; 521/71; 521/155; 524/589; 524/590; 264/51; 264/215; 264/216
[58] Field of Search ................... 521/50, 65, 67, 521/71, 155; 528/44, 75, 76, 85, 502; 524/589, 590; 264/51, 215, 216

[56] References Cited

U.S. PATENT DOCUMENTS

| | | |
|---|---|---|
| 3,380,967 | 4/1968 | Lowe et al. . |
| 3,632,707 | 1/1972 | Rice . |
| 4,074,960 | 2/1978 | Dockray et al. ................ 425/89 |
| 4,230,823 | 10/1980 | Alberts et al. ................ 521/137 |
| 4,298,557 | 11/1981 | Bradford et al. ................ 264/51 |
| 4,487,854 | 12/1984 | Hartman . |
| 4,950,694 | 8/1990 | Hager . |

FOREIGN PATENT DOCUMENTS 794403   5/1958   United Kingdom .

*Primary Examiner*—Nathan M. Nutter
*Assistant Examiner*—Duc Truong
*Attorney, Agent, or Firm*—Paul L. Marshall

[57] ABSTRACT

A flexible open-cell polyurethane is described that is the reaction product of a mixture comprising (a) a polyisocyanate component comprising monomeric or polymeric MDI, and
(b) a polyol component having at least 50% of its OH functional groups as secondary OH groups.

20 Claims, No Drawings

FLEXIBLE OPEN-CELL POLYURETHANE FOAM

This is a continuation in part of application Ser. No. 08/272,475 filed Jul. 11, 1994, now abandoned;

FIELD OF THE INVENTION

This invention relates to polyurethane foams in general and to processes for the preparation thereof. Specifically, the invention relates to open-cell flexible foams such as those useful for carpet underlay or furniture applications.

BACKGROUND OF THE INVENTION

Open cell flexible polyurethane foams are widely used in a variety of applications. They offer high resiliency and load-bearing properties, rendering them useful for applications such as furniture cushions and carpet underlay. Open-cell flexible polyurethane foams have traditionally been prepared from TDI (toluene diisocyanate) polyisocyanate components. However, for many high load-bearing applications, such as carpet underlay, TDI-based foams typically have a density of <3 lbs/ft$^3$, and are subject to fatigue where load-bearing capacity is reduced. This is particularly acute for carpet underlay, where high traffic areas can suffer from premature carpet underlay fatigue.

MDI has been used to make high-density open cell flexible polyurethane foams. These foams can provide dense foams (>3 lbs/ft$^3$), which can offer advantages in fatigue resistance compared to TDI-based foams. TDI-based foams cannot be readily prepared with densities above 3 lbs/ft$^3$. MDI-based foams also offer good tensile strength (>35 psi) and tear strength (>2.75 pi). However, the increased reactivity of MDI-based polyisocyanate components can cause various problems. Depending on the nature of the polyol used in combination with the MDI-based polyisocyanate, the foam produced may exhibit high hardness rendering it inappropriate for cushioning use. Also, the necessary degree of open cell structure in the foam may not be achieved.

One significant problem encountered in the preparation of MDI-based open cell flexible polyurethane foams has been the formation of so-called "creme balls" in the foam preparation equipment. Creme balls are regions of polyurethane foam that form and remain in the foam preparation equipment, causing fouling and reducing the yield of good quality foam from the equipment. This problem is particularly severe in trough-type slabstock foam dispensing machines. It is toward the problem of providing open-cell flexible polyurethane foams exhibiting good fatigue properties and reduced tendency for fouling of foam dispensing equipment that the present invention is directed.

SUMMARY OF THE INVENTION

According to the present invention, there is provided a flexible open-cell polyurethane foam that is the reaction product of a mixture comprising (a) a polyisocyanate component comprising monomeric or polymeric MDI, and (b) a polyol component having at least 50% of its OH functional groups as secondary OH groups. Foams according to the present invention provide good fatigue properties and reduced tendency for fouling of foam dispensing equipment.

DESCRIPTION OF THE PREFERRED EMBODIMENTS

The polyisocyanate component (a) comprises monomeric or polymeric MDI. These are well-known in the art, and include 4,4'-, 2 4'-, and 2 2'-diphenylmethane diisocyanate, various polyphenylenepolymethylene polyisocyanates (polymeric MDI), and mixtures of some or all of these compounds. The polyisocyanate component (a) may also include one or more other aliphatic, cycloaliphatic, araliphatic, and/or aromatic polyisocyanates. Specific examples of such other polyisocyanates include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate, and 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), and 2,4- and 2,6-hexahydrotoluene diisocyanate, as well as the corresponding isomeric mixtures; 4,4'- 2,2'-, and 2 4'-dicyclohexylmethane diisocyanate as well as the corresponding isomeric mixtures; and other aromatic polyisocyanates such as 2,4- and 2,6-toluene diisocyanate (TDI) and the corresponding isomeric mixtures. The polyisocyanate component (a) should contain at least 70 weight percent MDI, and preferably from 75 to 90 weight percent MDI. In one preferred embodiment, the polyisocyanate component (a) comprises a mixture of monomeric and/or polymeric MDI plus TDI. Any of the above polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups (also known as isocyanate prepolymers) and having a free NCO content of 20 to 46 weight percent, preferably 25 to 40 weight percent, based on the total weight, which may be prepared by reacting polyisocyanate with low molecular weight diols, triols, dialkylene glycols, trialkylene glycols, or polyoxyalkylene glycols with a molecular weight of up to 1500. Examples of polyols useful for preparing isocyanate prepolymers include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Isocyanate prepolymers may optionally be mixed together or mixed with unmodified organic polyisocyanates such as 2,4'- and 4,4'diphenylmethane diisocyanate, polymeric MDI, 2,4- and/or 2,6-toluene diisocyanate.

Crude polyisocyanates may also be used in the compositions of the present invention, such as crude toluene diisocyanate obtained by the phosgenation of a mixture of toluene diamines or crude diphenylmethane diisocyanate obtained by the phosgenation of crude diphenylmethane diamine.

The polyol component (b) comprises one or more polyol compounds such that at least 50% of the OH functional groups of the polyol component are secondary OH groups. Representative polyols which may be employed in the invention are well-known to those skilled in the art. Representative polyols include polyhydroxyl-containing polyesters, polyoxyalkylene polyether polyols, polyhydroxyterminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups (e.g., amino alcohols) within the above-defined classes may also be used. Also, alkylene oxide adducts of compounds which contain one SH group and one OH group as well as those which contain an amino group and an SH group may be used. Generally, the equivalent weight of the polyols will vary from 500 to 10,000, preferably from 750 to 3000.

Any suitable hydroxy-terminated polyester may be used such as can be prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, maleic acid, fumaric acid, glutaconic acid, terephthalic acid, and the like. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alpha -methyl glucoside, pentaerythritol, and sorbitol. Also included within the term "polyhydric alcohol" are compounds derived from phenol such as 2,2-bis(4-hydroxyphenyl)propane, commonly known as Bisphenol A. In order to obtain secondary hydroxy functional groups, the polyester should be capped with a secondary hydroxyl-containing polyol, such as 1,2-propanediol, 1,3-butanediol, 1,2-butanediol, or similar materials.

Also, polyols containing ester groups can be employed in the subject invention These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Although a variety of polyol compounds may be utilized to incorporate secondary hydroxyl groups, such as the above-described polyester polyols, the polyol component is preferably principally composed of polyether polyol(s).

The polyether polyol composition useful in the practice of the invention contains a predominant amount of secondary hydroxyl groups, with a composition consisting of all secondary hydroxyl groups being preferred. By a predominant amount of secondary hydroxyl group containing polyether polyol composition, it is meant that at least 50 weight percent of the hydroxyl groups should be secondary hydroxyl groups such as those derived from propylene oxide. It may be preferable to add ethylene oxide during chain extension of the polyether polyol to prepare a heteric or internal block polyether polyol so long as less than 50 weight percent of the polyol is terminated with primary hydroxyl groups such as those derived from ethylene oxide. Although it is within the scope of the invention to add the above minor amounts of ethylene oxide to an initiator molecule as a cap, it is preferable to prepare a polyoxyalkylene polyether polyol exclusively containing secondary hydroxyl groups.

Methods of making polyether polyols are well known and include those polyethers prepared from the base catalyzed addition of an alkylene oxide such as ethylene oxide, propylene oxide or butylene oxide, preferably ethylene oxide, to an initiator molecule containing, on the average, two or more active hydrogens. The polyoxyalkylene polyether polyols are well-known in the art and may be prepared by any known process such as, for example, the process disclosed by Wurtz in 1859 and Encyclopedia of Chemical Technology, Vol. 7, pp 257–262, published by Interscience Publishers, Inc. (1951). In one preferred embodiment of the invention, the polyether polyol comprises 5 to 20 weight percent ethylene oxide units. Also, at least 50%, and preferably 70–100% of the hydroxyl functional groups on the polyol are preferably secondary hydroxyl groups, preferably derived from propylene oxide capping groups on polyether polyols.

Examples of initiator molecules are diethylene glycol, ethylene glycol, dipropylene glycol, propylene glycol, trimethylene glycol, 1,2-butanediol, 1,3-butanediol, 1,4-butanediol, 1,4-pentanediol, 1,5-pentanediol, 1,6-hexanediol, 1,7-heptanediol, glycerine, 1,1,1-trimethylolpropane, 1,1,1-trimethylolethane, 1,2,6-hexanetriol, or triethylolpropane. Particularly preferred initiators include trimethylolpropane, glycerine, propylene glycol, and blends of polyoxyalkylene polyether polyols initiated thereby, with glycerine and trimethylolpropane being most preferred. Suitable alkylene oxides include ethylene oxide, propylene oxide, butylene oxide, amylene oxide, and mixtures of these oxides. Preferred is the reaction product of ethylene oxide or a mixture of ethylene oxide and propylene oxide with one of the aforementioned initiators, followed by capping of the polyether with propylene oxide, to yield a polyether polyol having only predominantly secondary hydroxyl groups.

In one embodiment, the polyether polyol has a equivalent weight of from 1000 to 2000, an average functionality from about 2.0 to 4, and a hydroxyl number from 20 to 60.

The polyol component (b) may also contain solid polymer particles. Preferred polymer particle-containing polyols are the so-called graft polyols comprising a carrier polyol containing predominantly secondary hydroxyl groups along with polymer particles. Graft polyols are well known to the art and are typically prepared by the in situ polymerization of one or more vinyl monomers, preferably acrylonitrile and styrene, in the presence of a polyether or polyester polyol, particularly polyols containing a minor amount of natural or induced unsaturation, followed by optional blending with additional liquid polyol. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. Nos. 4,524,157, 4,661,531, Re 33,291, all of which are herein incorporated by reference. In one embodiment of the invention, the polyol component (a) has a solids content of 4 to 60 weight percent, and the polymer particles are acrylonitrile:styrene with an acrylonitrile:styrene ratio of (4:1 to 1:4).

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments.

Chain-extending agents may also be used in the preparation of the polyurethane foams according to the present invention. These include compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used in the preparation of foams according to the invention, including tertiary amines such as, for example, triethylenediamine, N-methylmorpholine, N-ethylmorpholine, diethylethanolamine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is often useful for production of high grade polyurethane foam according to the present invention to prevent foam collapse and promote good cell structure. Numerous surface-active agents have been found satisfactory. Nonionic surface active agents such as silicone-based compounds, are preferred. Other useful surface-active include polyethylene glycol ethers of long chain alcohols, tertiary amine or alkanolamine salts of long chain alkyl acid sulfate esters, alkyl sulfonic esters, and alkyl arylsulfonic acids.

Suitable processes for the preparation of cellular polyurethane foams are disclosed in U.S. Pat. No. Re. 24,514 together with suitable machinery to be used in conjunction therewith. When water is added to generate $CO_2$ as blowing agent, corresponding quantities of excess isocyanate to react with the water may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as cyclopentane, pentane, hexane, heptane, pentene, and heptene; azo compounds such as azohexahydrobenzodinitrile; CFC halogenated hydrocarbons such as dichlorodifluoromethane, trichlorofluoromethane, dichlorodifluoroethane, HCFC hydrocarbons, HFC hydrocarbons, and methylene chloride may be used as blowing agents.

The composition of the present invention is particularly useful for producing slab or bun foams. Such foams can be prepared by (a) mixing
  (1) a polyisocyanate component comprising monomeric or polymeric MDI, and
  (2) a polyol component having at least 50% of its OH functional groups as secondary OH groups to form a polyurethane reaction mixture, (b) applying the polyurethane reaction mixture onto a moving substrate to form a polyurethane bun, and (c) removing the polyurethane bun from the substrate. The problem of creme ball formation can be particularly acute in so-called trough foam machines. Trough machines are well-known in the art and are described, for example, in U.S. Pat. Nos. 4,074,960 and 4,298,557. Thus, in preferred embodiment of the invention, the above-described process further comprises the step of filling a dispensing trough having an overflow weir with the polyurethane reaction mixture so that the polyurethane reaction mixture flows across the overflow weir onto the moving substrate.

The invention is further described by the following

EXAMPLES 1

Formulations (A), (B), (C), and (D) were weighed into an one-quart paper cup, mixed for 20 seconds at 1500 rpm using a small German type mix blade, then placed such that the #4 spindle of a Brookfield Digital viscometer was immersed appropriately into the mixed components to record viscosities until the mixture gelled (>200,000 cP).

| Formulation, PBW | A | B | C | D |
| --- | --- | --- | --- | --- |
| Polyol A' | 100.0 | — | — | 100.0 |
| Polyol B' | — | 100.0 | — | — |
| Polyol C' | — | — | 100.0 | — |
| dibutyltin dilaurate | 0.02 | 0.02 | 0.02 | 0.02 |
| Isocyanate A | 5.5 | 5.5 | 5.5 | — |
| TDI (80/20) | — | — | — | 3.9 |
| Time to Gel, Minutes | 3 | 9.5 | 13.5 | <15 |

Polyol A' is a graft polyol having 31% solids acrylonitrile:styrene in carrier polyol A. Polyol A is a TMP-initiated PO polyether polyol having an EO cap for a total EO content of 13% and an OH number of 35. Polyol B' is a graft polyol having 31% solids acrylonitrile:styrene in carrier polyol that is a 38:62 blend of polyol A and B. Polyol B is a glycerine-initiated heteric EO/PO (weight % ratio 12:88) polyether polyol having a PO cap and an OH number of 35. Polyol C' is a graft polyol having 31% solids acrylonitrile:styrene in in carrier polyol B. Isocyanate A is a 77:23 blend of carbodiimide-modified MDI/TDI.

EXAMPLE 2

Hand-mix foams were then prepared according to the following procedure. All foaming components, except isocyanate, were weighed into a half-gallon paper cup and mixed 30 seconds at 1800 rpm with a large German type mix blade. The isocyanate was weighed into a separated container, added to the mixture previously described and mixed 10 seconds at 1800 rpm. This foaming mixture was immediately poured into a 5 gallon plastic payliner and observations recorded. The hand-mix foaming reactivity of formulation F was significantly slower than formulation E based upon observed cream and rise times. The physical properties between the foams prepared from these two formulations were similar. Formulations and physical properties are listed in Table I. The hand-mix foaming reactivity of the formulation H was significantly slower than formulation G based upon observed cream and rise times. The physical and fatigue properties were similar. Formulations and physical properties are listed in Table II.

EXAMPLE 3

A laboratory scale slabstock machine was employed using a mock-up dispensing trough to simulate the production environment under which fouling and build-up could be observed. All components were metered in separate streams into a pin-mixer type pour-head which then dispenses the foaming mixture into the mock-up trough. The foaming reacting mass was allowed to froth over onto a moving conveyor belt. This continuous foaming operation was allowed to run until a 30-foot block of foam was made. Observations made while pouring foam with formulation I showed fouling (cream balls) and build-up in the trough. Observations made while pouring foam with formulation J showed some fouling and build-up in the trough started at about 2.5 minutes into the pour and was comparable to the formulation I fouling when the pour was stopped after 4 minutes. Observations made while pouring foam with formulation K showed no fouling and/or build-up occurred in the trough for a pour which lasted about 6 minutes. The physical and fatigue properties were similar in comparing the formulation I foam with the formulation J and K foams. Formulations and physical properties are listed in Table III. As used herein, catastrophic fatigue is defined as the castor fatigue test of ASTM 3574-91 modified in that no carpet is used and the number of cycles is 40,000.

TABLE I

Hand-mix Foaming Study

| Formulations | E | F |
|---|---|---|
| Polyol A' | 100.0 | — |
| Polyol B' | — | 100.0 |
| silicone surfactant | 1.6 | 1.2 |
| diethanol amine | 0.7 | 0.7 |
| flame retardant | 3.0 | 3.0 |
| 33% triethylene diamine in dipropylene glycol | 0.15 | 0.15 |
| dibutyltin dilaurate | 0.1 | 0.1 |
| Water | 2.0 | 2.0 |
| Isocyanate A | 40.2 | 40.2 |
| Hand-mix observations | | |
| Cream time, seconds | 25 | 29 |
| Rise time, seconds | 109 | 126 |
| Height, Inches | 10.5 | 11 |
| Comments | HB,SB | HB |
| Foam Properties | | |
| Density, PCF | 3.57 | 3.20 |
| Tensile, PSI | 45 | 41 |
| H.A. Tensile, PSI | 46 | 37 |
| Elongation, % | 90 | 110 |
| Tear, PI | 3.5 | 3.0 |
| Resilience, % | 37 | 29 |
| IFD, lbs./50 sq. In. (4 Inch) | | |
| 25% | 138.1 | 121.7 |
| 65% | 351.0 | 257.4 |
| 25% Return | 92.2 | 83.5 |
| Sag Factor | 2.54 | 2.12 |
| % Recovery | 92.2 | 83.5 |
| Compression Sets, % Set 75% | 15 | 16 |
| Air Flow, CFM | 0.3 | 0.1 |

HB = Health Bubbles, SB = Sigh Back

TABLE II

Hand-mix Foaming Evaluation

| Formulations | G | H |
|---|---|---|
| Polyol A' | 100.0 | — |
| Polyol B' | — | 100.0 |
| silicone surfactant | 1.6 | 1.2 |
| diethanol amine | 0.7 | 0.7 |
| flame retardant | 3.0 | 3.0 |
| 33% triethylene diamine in dipropylene glycol | 0.15 | 0.15 |
| dibutyltin dilaurate | 0.1 | 0.1 |
| Water | 2.0 | 2.0 |
| Isocyanate A | 40.2 | 40.2 |
| Hand-mix observations | | |
| Cream time, seconds | 24–26 | 27–29 |
| Rise time, seconds | 88 | 107 |
| Height, Inches | 10.5 | 11 |
| Comments | HB,SB | HB,SB |
| Foam Properties | | |
| Density, PCF | 3.00 | 3.18 |
| Tensile, PSI | 36 | 40 |
| H.A. Tensile, PSI | 33 | 40 |
| Elongation, % | 103 | 137 |
| Tear, PI | 3.5 | 4.0 |
| Resilience, % | 32 | 24 |
| IFD, lbs./50 sq. In. (4 Inch) | | |
| 25% | 84.8 | 74.7 |
| 65% | 208.6 | 177.0 |
| 25% Return | 56.6 | 49.7 |
| Sag Factor | 2.46 | 2.37 |
| % Recovery | 66.2 | 66.6 |
| Compression Sets, % Set 75% | 10 | 16 |
| Air Flow, CFM | 0.2 | 0.1 |
| Catastrophic Fatigue, 40K cycles, No Carpet | | |
| Height, % Loss | 1.9 | 3.0 |
| 65% IFD, % Loss | 72.5 | 73.2 |

HB = Health Bubbles, SB = Sigh Back

TABLE III

Results of Lab Pours

| Formulation | I | J | K |
|---|---|---|---|
| Polyol A' | 100.0 | — | — |
| Polyol B' | — | 100.0 | — |
| Polyol C' | — | — | 100.0 |
| silicone surfactant | 1.6 | 1.6 | 1.3 |
| diethanol amine | 0.7 | 0.7 | 0.7 |
| flame retardant | 3.0 | 3.0 | 3.0 |
| 33% triethylene diamine in dipropylene glycol | 0.2 | 0.2 | 0.2 |
| dibutyltin dilaurate | 0.1 | 0.1 | 0.1 |
| Water | 2.0 | 2.0 | 2.0 |
| Isocyanate A, Index | 110 | 110 | 110 |
| Foam Properties | | | |
| Density, PCF | 3.33 | 3.73 | 3.28 |
| Tensile, PSI | 56 | 57 | 54 |
| H.A. Tensile, PSI | 58 | 63 | 61 |
| Elongation, % | 100 | 77 | 100 |
| Tear, PI | 2.9 | 3.1 | 3.7 |
| Resilience, % | 36 | 27 | 28 |
| IFD, lbs. (4 inch) | | | |
| 25% | 161 | 176 | 161 |
| 65% | 429 | 484 | 413 |
| 25% Return | 97 | 112 | 99 |
| Sag Factor | 2.67 | 2.75 | 2.56 |
| % Recovery | 60 | 47 | 61 |
| Compression Sets, % Set (75%) | 17 | 39 | 20 |
| Humid Aged 3 hrs. @ 220° F. | | | |
| CLD, % of Original 50% | 95 | 91 | 96 |

TABLE III-continued

Results of Lab Pours

| Formulation | I | J | K |
| --- | --- | --- | --- |
| Compression Sets, % Set 75% | 19 | 35 | 19 |
| Air Flow, CFM | 0.4 | 0.1 | 0.1 |
| Catastrophic, 40K cycles - No Carpet | | | |
| Height, % Loss | 4.5 | 4.0 | 3.1 |
| 65% IFD, % Retained | 70 | 72 | 66 |

What is claimed is:

1. A method of preparing a flexible open-cell polyurethane foam comprising the steps of
   (a) mixing
      (1) a polyisocyanate component comprising monomeric or polymeric MDI, and
      (2) a polyol component having at least 50% of its OH functional groups as secondary OH groups to form a polyurethane reaction mixture and filling a dispensing trough having an overflow weir with said polyurethane reaction mixture,
   (b) causing the polyurethane mixture to flow across the overflow weir, thereby applying the polyurethane reaction mixture onto a moving substrate to form a polyurethane bun, and
   (c) removing the polyurethane bun from the substrate.

2. A method of preparing a flexible open-cell polyurethane foam according to claim 22 wherein the polyol component has an equivalent weight of from 700 to 2500.

3. A method of preparing a flexible open-cell polyurethane foam according to claim 24 wherein the polyol component has an equivalent weight of 1000 to 2000.

4. A method of preparing a flexible open-cell polyurethane foam according to claim 2 wherein the polyol component comprises a dispersion of polymer particles dispersed in a carrier polyol.

5. A method of preparing a flexible open-cell polyurethane foam according to claim 2 wherein the polyol component comprises a dispersion of polymer particles dispersed in a carrier polyol.

6. A method of preparing a flexible open-cell polyurethane foam according to claim 5 wherein the polymer particles are a copolymer of acrylonitrile and styrene.

7. A method of preparing a flexible open-cell polyurethane foam according to claim 6 wherein the ratio of acrylonitrile to styrene is between 4:1 and 1:4.

8. A method of preparing a flexible open-cell polyurethane foam according to claim 1 wherein the polyol component has an average hydroxyl functionality of 2 to 4.

9. A method of preparing a flexible open-cell polyurethane foam according to claim 6 wherein the polyol component has an OH number of 20 to 60.

10. A method of preparing a flexible open-cell polyurethane foam according to claim 1 wherein said polyol component comprises a polyether polyether polyol having an equivalent weight of from 1000 to 2000.

11. A method of preparing a flexible open-cell polyurethane foam according to claim 9 wherein said polyether polyol comprises from 5 to 20% ethylene oxide units and is at least partially capped with propylene oxide.

12. A method of preparing a flexible open-cell polyurethane foam according to claim 1 wherein said polyol component has 70–100% of its OH functional groups as secondary OH groups.

13. A method of preparing a flexible open-cell polyurethane foam according to claim 12 wherein the polyol component is a polyether polyol and said secondary OH groups are derived from propylene oxide capping groups.

14. A method of preparing a flexible open-cell polyurethane foam according to claim 12 wherein 100% of the polyol component's OH functional groups are secondary OH groups.

15. A method of preparing a flexible open-cell polyurethane foam according to claim 14 wherein the polyol component is a polyether polyol and said secondary OH groups are derived from propylene oxide capping groups.

16. A method of preparing a flexible open-cell polyurethane foam according to claim 1 wherein said polyisocyanate component further comprises TDI.

17. A method of preparing a flexible open-cell polyurethane foam according to claim 1 wherein the foam thereby produced has a density of at least 3 lbs/ft$^3$.

18. A method of preparing a flexible open-cell polyurethane foam according to claim 16 wherein the foam thereby produced has a catastophic fatigue of at least 65% retained at 65% IFD.

19. A method of preparing a flexible open-cell polyurethane foam according to claim 1 wherein the foam thereby produced has a catastophic fatigue of at least 65% retained at 65% IFD.

20. A method of preparing a flexible open-cell polyurethane foam according to claim 1 wherein the foam thereby produced has a tensile strength of at least 35.0 psi.

* * * * *